(12) United States Patent
Plessing et al.

(10) Patent No.: US 11,300,940 B1
(45) Date of Patent: Apr. 12, 2022

(54) APPLICATION CODE MANAGER AND INTELLICENTER INTEGRATION

(71) Applicant: Rockwell Automation Technologies, Inc., Mayfield Heights, OH (US)

(72) Inventors: Jerald E. Plessing, Kennard, NE (US); Philip M. Hamilton, Bettendorf, IA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/036,886

(22) Filed: Sep. 29, 2020

(51) Int. Cl.
G05B 19/05 (2006.01)
G06F 9/54 (2006.01)

(52) U.S. Cl.
CPC ............ G05B 19/056 (2013.01); G06F 9/547 (2013.01)

(58) Field of Classification Search
CPC .................. G06F 9/547; G05B 19/056
See application file for complete search history.

(56) References Cited

U.S. PATENT DOCUMENTS

| | | | |
|---|---|---|---|
| 2006/0026193 A1* | 2/2006 | Hood | G05B 19/0426 |
| 2007/0073426 A1* | 3/2007 | Chand | G05B 19/0426 |
| | | | 700/87 |
| 2014/0156710 A1* | 6/2014 | VanGompel | G05B 19/4183 |
| | | | 707/803 |
| 2017/0068235 A1* | 3/2017 | Manabe | G05B 19/05 |
| 2017/0168474 A1* | 6/2017 | Ozaki | H04L 67/34 |
| 2018/0224820 A1* | 8/2018 | Jiang | G05B 19/0426 |
| 2019/0149400 A1* | 5/2019 | Plache | G05B 19/00 |
| | | | 709/220 |
| 2019/0256300 A1* | 8/2019 | Shimamura | B25J 9/1697 |

* cited by examiner

*Primary Examiner* — Charles E Anya (57) ABSTRACT

Various embodiments of the present technology generally relate to industrial automation device configurations and programmable logic. More specifically, some embodiments relate to a method of integrating industrial automation device configurations and application logic in industrial environments. To reduce time and errors, an automated method enables industrial enterprises, employers, and other users to obtain a list of devices in an automation process comprising at least one device and a logical representation of the device. In order to configure the device to function optimally in the industrial environment, a system representation of the automation process comprising corresponding input/output configurations for each device in the list may be obtained. After identifying further device configuration parameters associated with the device and the system representation, the logical representation may be updated and enabled in a programmable controller, such as a programmable logic controller or programmable automation controller, to control the devices properly in the automation process.

20 Claims, 7 Drawing Sheets

APPLICATION CODE MANAGER AND INTELLICENTER INTEGRATION

TECHNICAL FIELD

Aspects of the particular disclosure are related to software and hardware technology, and in particular, to industrial automation applications.

BACKGROUND

A motor control center (MCC) controls the operation of electric motors in industrial automation environments such as factories, plants, and the like. The MCC includes programmable controllers, devices, such as motors, and software, firmware, or the like. Programmable controllers, examples of which include programmable logic controllers (PLCs) and programmable automation controllers (PACs), are configured to control various industrial processes per device and process logic that is encoded into the control programs.

Binding is a process of associating one or more objects with identifiers in a computer program so that the objects can be implemented in a process. In the industrial automation context, binding is a process of associating a system of devices, based on their function, location, and other factors, with logical representations, such that the system of devices performs in the industrial automation environment. Logic binding solutions typically involve manually configuring one or more devices and their parameters to a logic application. Such solutions require choosing individual devices and binding objects one by one in order for the logic application to properly identify and use the device in the defined process.

An industrial automation device logic binding solution evaluates an entire system of automation devices and must assign each device to a controller and a task for the automation process to function properly. A problem that exists today occurs when some parameters exist in one application, but others derive from another application. Existing solutions employ time-consuming, error-prone configurations due to the individual assignment and parameterization needed to implement a set of devices into the system. For example, with the purchase of an MCC, multiple motors need to be configured based on the customer's processes and logic controllers. The task of manually binding or linking each motor to a logical representation can lead to failure of the entire system or improper performance of the devices in the system due to an incorrect or missing device configuration parameter.

It is with respect to this general technical environment that aspects of the present technology disclosed herein have been contemplated. Furthermore, although a general environment has been discussed, it should be understood that the examples described herein should not be limited to the general environment identified in the background.

OVERVIEW

Various embodiments of the present technology generally relate to device logic binding in industrial environments. An industrial automation system in various implementations provides for the streamlined integration of device logic with industrial devices. In an implementation, the industrial automation system obtains a list of devices associated with an industrial automation process, such as the devices in a motor control center. The list of devices identifies one or more devices and associated logical representations and device configuration parameters. The industrial automation system then obtains a system representation of the industrial automation process including devices and corresponding input/output (I/O) configurations of the devices. Further device configuration parameters associated with the devices can also be obtained from the system representation. The logical representations of the devices are updated using further identified device configuration parameters. The result allows the industrial automation system to enable the system representation, using all associated devices and their logical representations, in a programmable controller to control the bound devices.

This Overview is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Various embodiments of the present technology generally relate to device logic binding in industrial environments to automate industrial processes. Some embodiments relate to an industrial automation computing apparatus that employs improved techniques for binding industrial automation devices to logic applications. While the device configuration compiler of the present disclosure is discussed in reference to industrial devices and motor control centers, the technology may be applied to any industrial device in an automation process other than those discussed herein. In industrial automation, device logic binding may refer to associating a device and its parameters, based on a system representation of an industrial automation process, to function in the process. Logic binding plays an important role in industrial automation processes, as it enables devices to perform various tasks necessary for the process to operate correctly. Embodiments herein include device logic compiling that a computing apparatus, application, or the like may use.

Technology in existing industrial automation systems do not provide a simple, efficient way by which industrial enterprises, facilities, devices, or the like may retrieve any device configurations or logical representations and configure them to be used in a motor control center, for example. Thus, manual efforts to perform such logic binding and device configuration processes tend to be time-consuming and error prone. In the industrial automation industry, an integrated, automated solution that reduces error and costs is needed to enable device configuration in any industrial system effectively.

In order to perform industrial automation operations, motor control centers (MCCs) and programmable controllers, examples of which include programmable logic controllers (PLCs) and programmable automation controllers (PACs), are essential. MCCs may be used to control some or all motors used in an industrial facility or process from a centralized location. The MCC may control attributes of the motors, such as speed, duration of operation, or the like. MCCs greatly increase efficiency in industrial systems. A PLC is a program-based computer used in motor control systems, typically used to synchronize operations and provide the MCC with logic to control the devices in the system. Similarly, in large, complex systems, PACs are used in motor control systems to operate multiple components in an architecture.

An industrial automation computing apparatus and a method of integrating industrial automation device configurations and application logic are disclosed. In accordance with the present disclosure, a computing apparatus comprises one or more computer-readable storage media and program instructions stored on the one or more computer-readable storage media that, when executed by one or more processors, direct the computing apparatus to perform device logic binding processes. The processing system obtains a list of devices associated with an industrial automation process. The list of devices, in accordance with the present technology, identifies a device and a logical representation of the device. The logical representation comprises one or more device configuration parameters associated with the device. The computing apparatus also obtains a system representation of the industrial automation process. The system representation identifies the device and corresponding input/output (I/O) configurations for the device. The computing apparatus updates the logical representation of the device with further identified device configuration parameters. Then, the system representation is enabled in a programmable controller using each device in the list of devices and updated logical representations of each device.

In accordance with the present disclosure, the computer apparatus enables industrial facilities or enterprises, employers, and other users to implement a system of devices or an MCC with the necessary logic to perform industrial processes. The ability to obtain and update logical representations of devices in an industrial system serves to reduce time, costs, and errors. As an example, a device logic binding computing apparatus may be implemented in an industrial facility to configure a newly purchased MCC comprising over a hundred motors acting in different capacities with respect to other machinery. Rather than configure each motor to operate with a given controller for a specific purpose, the device logic binding computing apparatus integrates each device in the MCC with logical representations based on the system requirements and architecture without requiring substantial manual effort or producing errors. These advantages allow the industrial enterprise to utilize the MCC more quickly and save time and money.

A method of logic binding, in accordance with the present technology, includes five foundational steps: device acquisition, system recognition, configuration acquisition, device linking, and system enablement. First, device acquisition includes obtaining a list of devices associated with an industrial automation process, wherein the list of devices identifies at least one device and a logical representation of the at least one device. The list of devices may be obtained from one or more databases and can be associated with an MCC. The logical representations obtained may also comprise a device configuration parameter associated with the at least one device. Next, system recognition includes obtaining a system representation of the industrial automation process, wherein the system representation identifies the at least one device and corresponding I/O configurations for each device in the list of devices. Configuration acquisition includes identifying at least a second device configuration parameter associated with the at least one device based on the system representation. For example, the system representation may identify an I/O configuration for a device, and the device may need to be linked to that configuration by the second device configuration parameter. Lastly, system enablement occurs after the logical representation of the at least one device is updated with all identified configuration parameters. The system representation is then enabled, in a PROGRAMMABLE CONTROLLER, to perform the industrial automation process using the configured devices.

Figure 1:
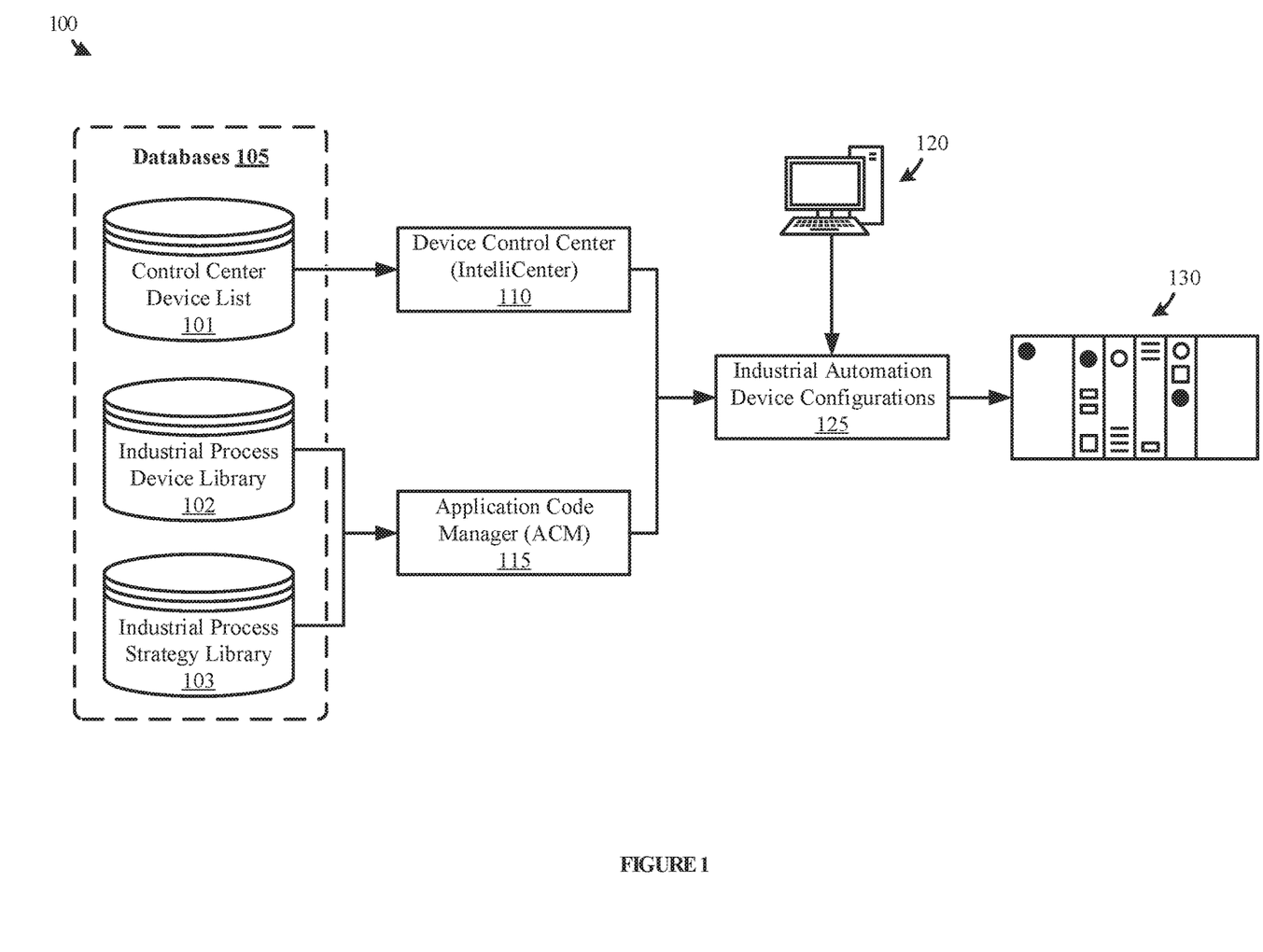
FIG. 1 illustrates an industrial automation environment including a device configuration compiler in accordance with some embodiments of the present technology.

Moving to the figures, FIG. 1 illustrates an example of an industrial automation system in which aspects of the present technology may be implemented. System 100 includes databases 105, device control center 110, application code manager (ACM) 115, user device 120, industrial automation device configurations 125, and industrial controller 130. Databases 105 may further include control center device list 101, industrial process device library 102, and industrial process strategy library 103. System 100 herein can include additional components, fewer components, and different components and still be in accordance with the technology of the present example. Likewise, databases 105 may communicate with other components or any combination of components.

In various embodiments, device control center 110 obtains a list of devices from control center device list 101. Control center device list 101 stores information on one or more devices associated with an industrial automation process. Devices in the device list comprise a logical representation with one or more device configuration parameters associated with the device. Such device configuration parameters comprise a device name or ID, a task, a controller, a communication module, or the like. Device control center 110 can communicate with control center device list 101 over an application programming interface (API), a wireless network, local network, or the like. In one example, device control center 110 receives a comma-separated values (CSV) file comprising the list of devices.

In parallel, ACM 115 obtains a logical system representation of an industrial process and a configuration strategy for the industrial process from industrial process device library 102 and industrial process strategy library 103. The logical system representation comprises one or more devices, that also exist in the list of devices, and input/output (I/O) configurations for the one or more devices as part of an industrial system architecture. The configuration strategy comprises logical representations or further device configuration parameters to operate the devices in the industrial system. In some embodiments, the further device configuration parameters comprises internet protocol (IP) addresses, automation controllers, and similar parameters or attributes. Databases 105 can be accessed by both device control center 110 and ACM 115 remotely, via a cloud-based storage service, or locally.

Both device control center 110 and ACM 115, along with input from user device 120, feed into industrial automation device configurations 125. Industrial automation device configurations 125 map and link the data acquired by device control center 110 and ACM 115. A data mapping comprises the list of identified devices associated with the industrial automation process, configuration parameters associated with the device itself, and configuration parameters associated with the system. In some examples, industrial automation device configurations 125 is embodied as a spreadsheet. In other examples, industrial automation device configurations 125 is embodied as a CSV or other exported data list. At this stage, user device 120 modifies or accepts the configuration parameters established. In various embodiments, user device 120 is a computer, mobile phone, tablet, or the like, that has the ability to edit the compiled data. Industrial automation device configurations 125 obtains data from both device control center 110 and ACM 115 over an API, a file transfer protocol (FTP), as a CSV import, or other similar data transfer or export/import mechanism.

Industrial automation device configurations 125 is used to generate an ACD file, or logic code file, to be used as input by a programmable controller, such as a PLC or PAC, to operate the industrial process. Industrial controller 130 serves to represent a motor control center (MCC) or include any devices in an MCC as part of an industrial process and may use the ACD file to control the devices using the code configured by industrial automation device configurations 125.

Figure 2:
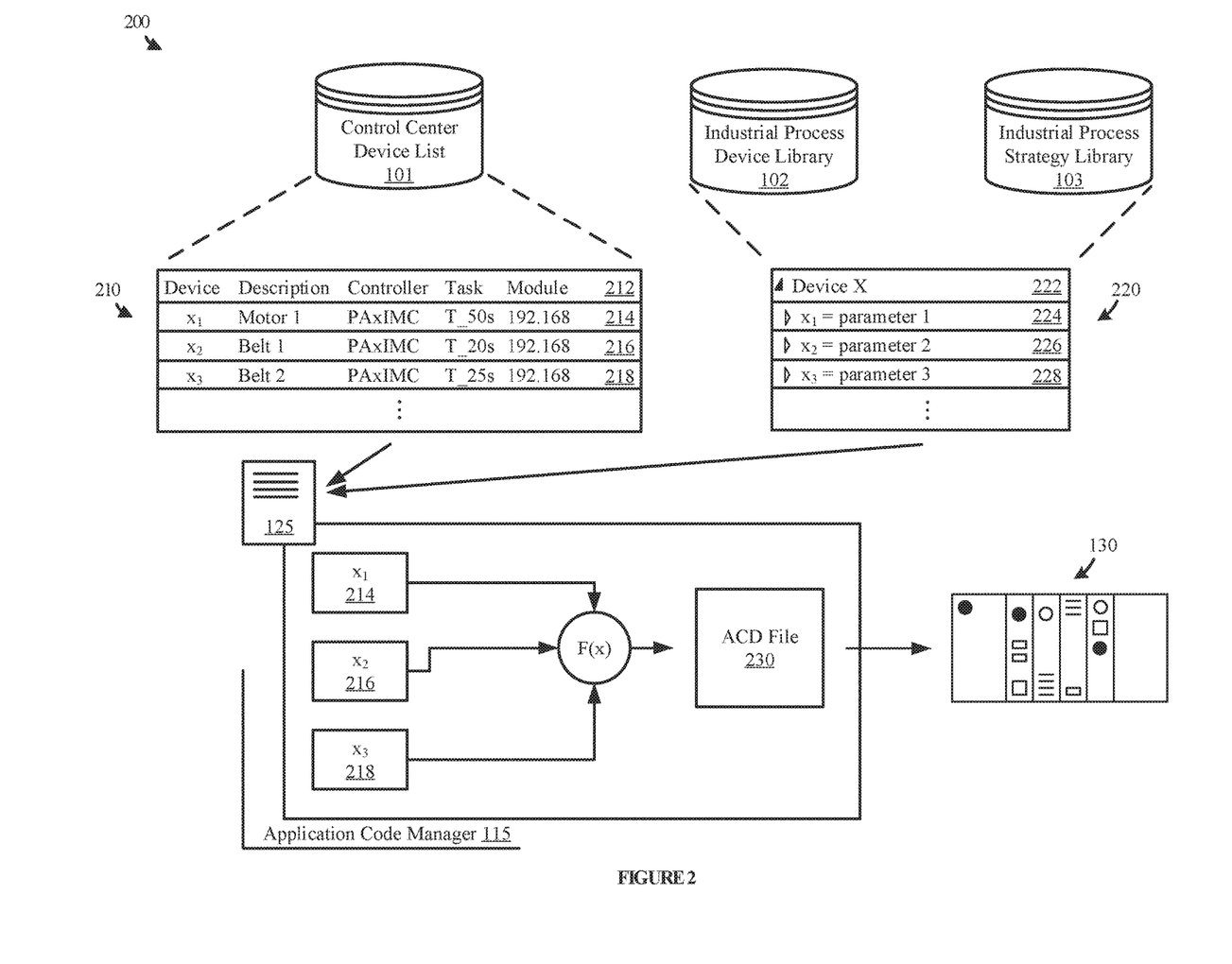
FIG. 2 illustrates an industrial automation environment including a device configuration compiler in accordance with some embodiments of the present technology.

FIG. 2 illustrates an industrial automation environment including a device configuration compiler in accordance with some embodiments of the present technology. FIG. 2 includes environment 200 which further includes control center device list 101, industrial process device library 102, industrial process strategy library 103, device list 210, device parameter table 220, industrial automation device configurations 125, ACM 115, ACD file 230, and industrial controller 130. Device list 210 demonstrates table header 212, first device 214, second device 216, and third device 218. Additionally, device parameter table 220 includes device name 222, first parameter 224, second parameter 226, and third parameter 228.

In some embodiments, control center device list 101 contains a list of devices associated with an industrial automation process or industrial enterprise. The device list, as illustrated by device list 210, comprises one or more devices organized in a table, matrix, or in another fashion. Table header 212 includes fields included in control center device list 101, such as device name, device description, controller, task, and module. As an example, table header 212 also includes additional fields for parameters such as control module type, sensing module type, and operation mode. Control center device list 101 can include additional parameters, fewer parameters, or different parameters associated with the data. As shown in FIG. 2, first device 214 may be a motor operating with controller PAxIMC that communicates with other devices over a specific IP address or communication module.

Referring now to device parameter table 220 obtained from both industrial process device library 102 and industrial process strategy library 103, the illustrated table comprises various configuration parameters associated with a device based on a system representation of an overall industrial process. Device name 222 corresponds to a family of devices, such as device X. For example, first parameter 224 is a device configuration parameter associated with x1. X1 also exists in control center device list 101 as first device 214 and has various parameters, as seen in device list 210. Thus, first device 214 and first parameter 224 are mapped together to form a logical representation of the device based on the system representation.

Industrial automation device configurations 125 obtains device list 210 and device parameter table 220 to link the data together. In some embodiments, industrial automation device configurations 125 may be embodied as a spreadsheet, table, matrix, or the like wherein device data is modified, added, deleted, or saved. Such operations allow device list 210 to merge or become linked with device parameter table 220.

Still referring to FIG. 2, industrial automation device configurations 125 are used in ACM 115 to surface the system representation, including devices and their respective configurations, in a graphical user interface. For example, in ACM 115, first device 214, second device 216, and third device 218 operate in a system or function as part of an industrial process. Based on the system, the devices operating in it, and their parameters, ACM 115 generates ACD file 230 that comprises device logic or code to operate the system. ACM 115 then sends ACD file 230 to industrial controller 130 as input for a PLC, PAC, or MCC to operate the devices in the industrial environment.

Figure 3:
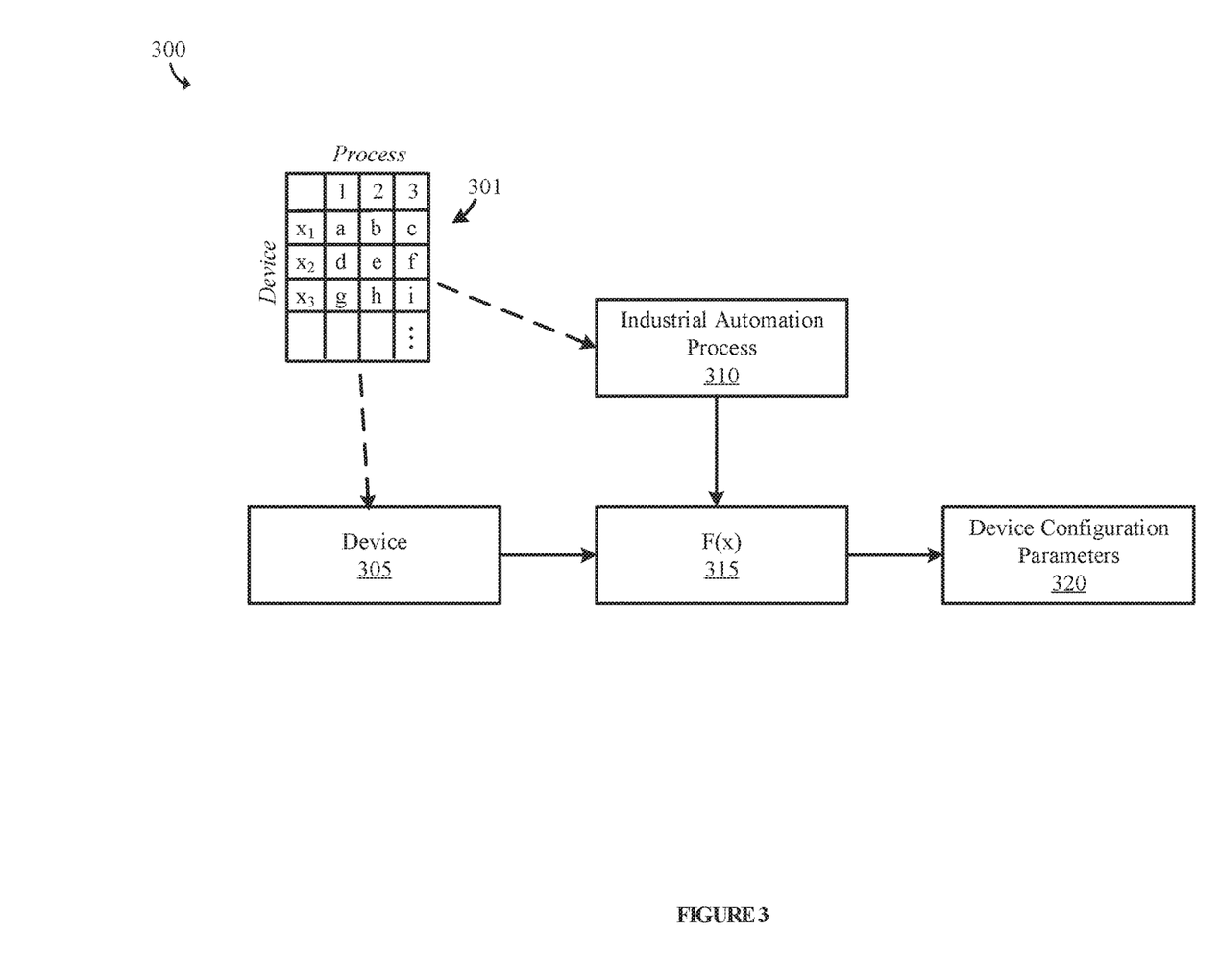
FIG. 3 illustrates an industrial process associated with a device configuration compiler in accordance with some embodiments of the present technology.

FIG. 3 illustrates an industrial process associated with a device configuration compiler in accordance with some embodiments of the present technology. FIG. 3 includes environment 300 which further includes industrial system matrix 301, device 305, industrial automation process 310, function 315, and device configuration parameters 320. Environment 300 functions to identify device configuration parameters based on a process performed by a device in an industrial system.

Industrial system matrix 301 comprises a list of devices and a list of processes associated with the devices. In some embodiments, industrial system matrix 301 functions like a look-up table. Using the data in industrial system matrix 301, device 305 and industrial automation process 310 are input into function 315. Function 315 automatically performs look-up operations to find the device associated with the process and the configuration parameter for the device associated with the process. As an example, function 315 surfaces, in a graphical user interface, a logic ladder representation of the system or process desired to be implemented in the industrial environment. One or more devices and/or processes may be used as inputs to function 315.

Following the identification of a process and device, device configuration parameters 320 can be determined, wherein the device configuration parameters 320 are used to bind the devices to logical representations. As a result, logical representations are employed by an application code manager or by a programmable controller to control devices to perform one or more processes in the industrial environment. In some embodiments, device configuration parameters 320 comprise a device name, a device description, an associated controller, I/O configurations, an operator station, a task, a communication module, a network connection, and the like.

Figure 4:
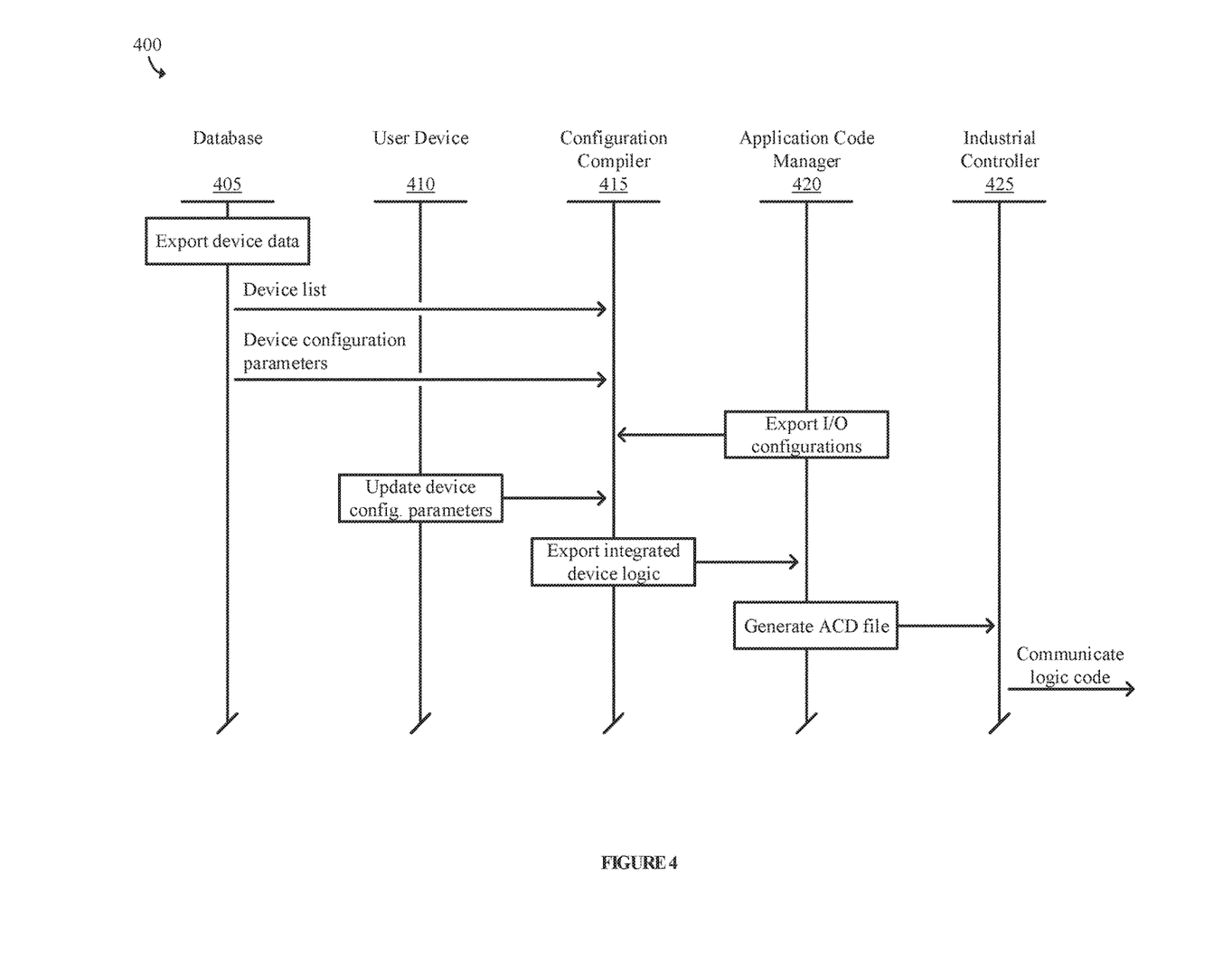
FIG. 4 illustrates a set of operations associated with an industrial automation device configuration process in accordance with some embodiments of the present technology.

FIG. 4 illustrates a set of operations associated with an industrial automation device configuration process in accordance with some embodiments of the present technology. Environment 400 in FIG. 4 demonstrates a device logic binding process, wherein data from various sources is integrated to generate a logic file representative of the devices and configuration parameters associated with an industrial automation process. Environment 400 includes database 405, user device 410, configuration compiler 415, application code manager (ACM) 420, and industrial controller 425.

Database 405 may be a local, remote, or cloud-based storage system that comprises a list of devices and device configuration parameters in an industrial enterprise. Such devices include, but are not limited to, motors, belts, controllers, and the like that function in various industrial processes. In some embodiments, database 405 communicates with configuration compiler 415 via an application programming interface (API) to send a device list and device configuration parameters. In other embodiments, configuration compiler 415 receives an exported CSV or similar type file to extract the information.

In some embodiments, configuration compiler 415 is a computing apparatus comprising one or more computer-readable storage media and program instructions stored on the one or more computer-readable storage media that, when executed by one or more processors, direct the computing apparatus to at least obtain device information from database 405. In other embodiments, configuration compiler 415 is a software application on user device 410. Upon obtaining data from database 405, user device 410 updates device configuration parameters within configuration compiler 415. In such embodiments, configuration compiler 415 may be in the form of a spreadsheet, table, matrix, or the like. In addition to receiving updates from user device 410, configuration compiler 415 obtains an export of I/O configurations from ACM 420 to update and integrate the device logic. In at least one embodiment, the I/O configurations are sent from ACM 420 via an API. Alternatively, ACM 420 uses a CSV import or a similar data import.

Next, configuration compiler 415 exports the integrated device logic, including the list of devices and their configuration parameters, to ACM 420. ACM 420 can operate on user device 410, on a different user device, or remotely. Using the integrated device logic, ACM 420 generates an ACD file ingestible by industrial controller 425. Industrial controller 425 may comprise an MCC, a programmable controller, a combination of both, or the like. Industrial controller 425 then communicates the logic code downstream to various devices or controllers.

Figure 5:
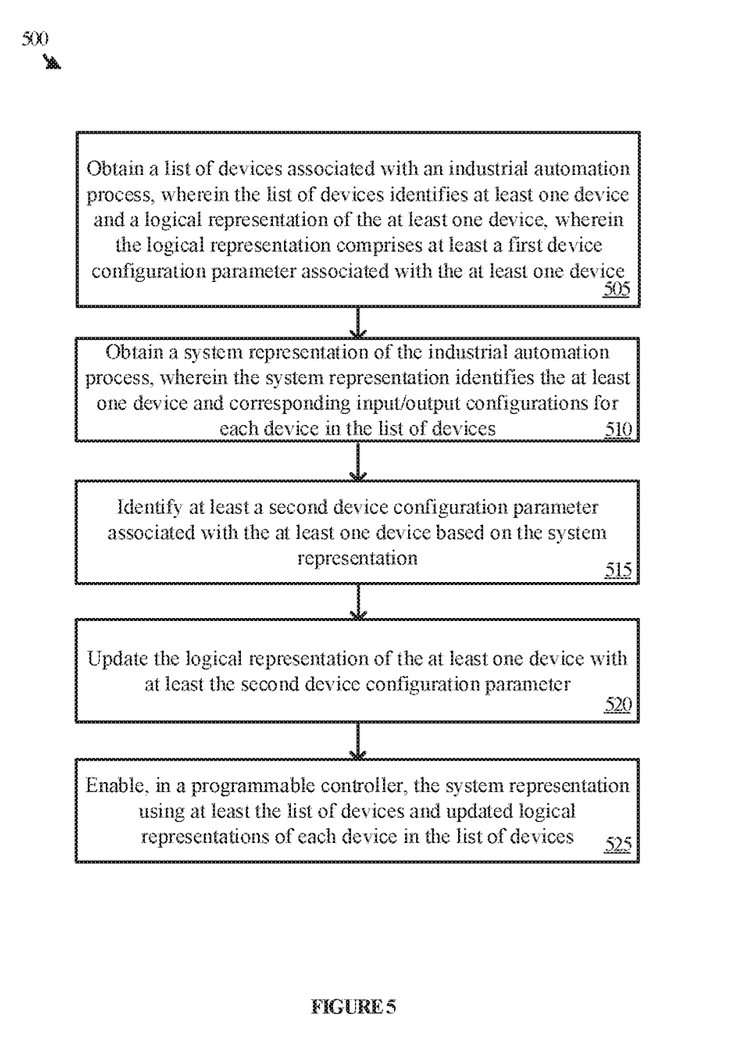
FIG. 5 illustrates a series of steps for obtaining industrial automation device parameters and configuration logic in accordance with some embodiments of the present technology.

FIG. 5 illustrates a series of steps for obtaining industrial automation device parameters and configuration logic in accordance with some embodiments of the present technology. FIG. 5 includes environment 500, wherein environment 500 further includes five steps that may accomplish a method of industrial automation device logic binding described herein.

First, in device acquisition step 505, a list of devices associated with an industrial automation process is obtained. The list of devices identifies one or more devices and corresponding logical representations of the one or more devices. Further, the logical representations comprise one or more device configuration parameters associated with the one or more devices. By way of example, the list of devices includes six motors functioning in an MCC in an industrial enterprise. Each motor can communicate with a different controller over varying communication channels. Specifically, the device ID, controller, and communication channel exemplify device configuration parameters, and together, they make up a logical representation of the device.

Next, in system acquisition step 510, a system representation of the industrial automation process is obtained. The system representation identifies one or more devices and corresponding I/O configurations for each device that allows the devices to function properly in the system. Continuing the example, the system representation embodies a conveyer belt system including all motors, belts, and other machinery required to operate the system. In order to allow the MCC to centrally control the motors responsible for this system, the system representation provides I/O logic for each device in the device list. Further, the system representation may also comprise a parent-child relationship between the devices and controllers within the system.

Based on the system representation obtained in system acquisition step 510, further device configuration parameters associated with the one or more devices in the list of devices are obtained in parameter identification step 515. In this step, logic or configuration parameters such as timing, duration, and speed in which to control each motor in the industrial process are identified and associated with a device. For example, to properly run the conveyer belt system, a first motor has to be initiated at a specific speed for twenty seconds before a second motor turns on for a different duration at a different speed.

Then, in update step 520, the logical representations of each device in the list of devices are updated to account for all device configuration parameters and I/O configurations. At this step, a user operating a user device may make manual updates to the devices and configuration parameters, if necessary. In such embodiments, the system representation and logical representations surface in a graphical user interface for the user to make modifications.

In system enablement step 525, the system representation comprising the list of devices and updated logical representations of each device is enabled in a programmable controller, such as a PLC or PAC. The PAC communicates the device logic downstream to operate the industrial process in the industrial enterprise. In some embodiments, an ACD file or other compatible file format are generated and communicated to the PAC containing the code to operate the machinery. The ACD file, or equivalent, may be communicated over an API or it may be exported in a variety of file formats to be ingested by a PAC, industrial controller, or the like.

Figure 6:
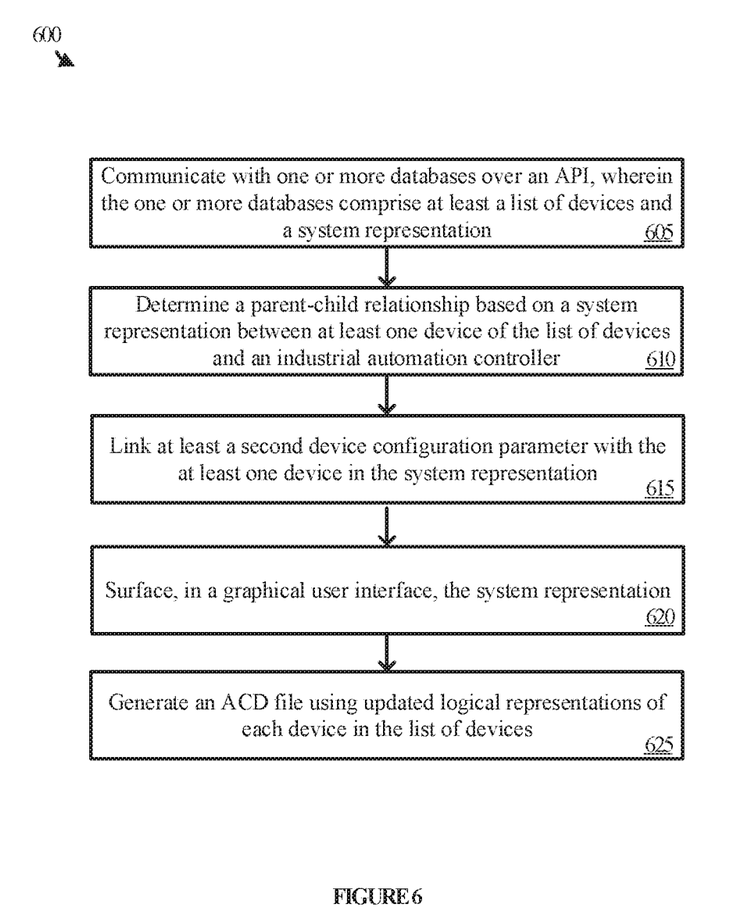
FIG. 6 illustrates a series of steps for obtaining industrial automation device parameters and configuration logic in accordance with some embodiments of the present technology.

FIG. 6 illustrates a series of steps for obtaining industrial automation device parameters and configuration logic in accordance with some embodiments of the present technology. FIG. 6 includes environment 600, wherein environment 600 further includes five steps that may accomplish a method of industrial automation device logic binding described herein.

Beginning with communication step 605, a device configuration compiler or computing apparatus communicates with one or more databases to obtain device information. In some embodiments, communication with the database occurs over an API, a file transfer protocol (FTP), or the database may be accessed locally. The one or more databases store a list of devices, logical representations of the devices in the list of devices, and system representations associated with industrial automation processes, among other data. By accessing the one or more databases, the computing apparatus obtains a family of motors and their logical representations to configure the motors to operate in an industrial process, for example.

The collected data is then used in identification step 610 to determine how the devices need to be configured to operate properly and efficiently. In this step, a parent-child relationship between a device on the list of devices and a controller that exists as part of the system representation is identified and linked. Mapping of configuration parameters such as I/O configurations, communication modules, operation modes, and the like may be obtained and determined based on the system representation.

In linking step 615, the computing apparatus links or binds the logical representations to devices in the list of devices. At this point, such logical representations comprise devices operating in the system, tasks or modes of operation, speeds or durations to run the devices at, controllers and communication channels to control the devices, and the like. Next, the system representation comprising the linked devices and logical representations may be surfaced in a graphical user interface. Using the GUI, a user can update device configuration parameters or logical representations, the system representation or its architecture, and other attributes. In some embodiments, an application code manager or other logic application can make the aforementioned modifications.

Using the updated system representation and logical representations, an ACD file, or equivalent logic file extension, is generated that can be used by an application, computing apparatus, processing system, or the like to control the devices in an industrial automation process, as shown in logic generation step 625.

Figure 7:
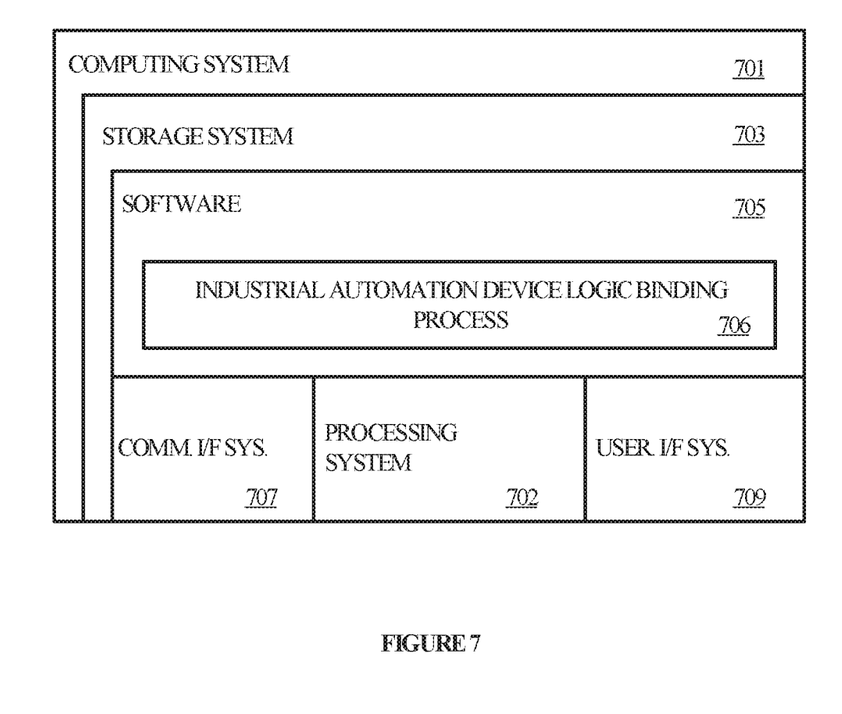
FIG. 7 illustrates a computing device that may be used in accordance with some embodiments of the present technology.

FIG. 7 illustrates computing system 701 to perform industrial automation device logic binding according to an implementation of the present technology. Computing system 701 is representative of any system or collection of systems with which the various operational architectures, processes, scenarios, and sequences disclosed herein for device logic binding may be employed. Computing system 701 may be implemented as a single apparatus, system, or device or may be implemented in a distributed manner as multiple apparatuses, systems, or devices. Computing system 701 includes, but is not limited to, processing system 702, storage system 703, software 705, communication interface system 707, and user interface system 709 (optional). Processing system 702 is operatively coupled with storage system 703, communication interface system 707, and user interface system 709.

Processing system 702 loads and executes software 705 from storage system 703. Software 705 includes and implements industrial automation device logic binding process 706, which is representative of the condition monitoring processes discussed with respect to the preceding Figures. When executed by processing system 702 to provide condition monitoring functions, software 705 directs processing system 702 to operate as described herein for at least the various processes, operational scenarios, and sequences discussed in the foregoing implementations. Computing system 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device but may also be distributed across multiple processing devices or sub-systems that cooperate in executing program instructions. Examples of processing system 702 include general purpose central processing units, graphical processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device but may also be implemented across multiple storage devices or sub-systems co-located or distributed relative to each other. Storage system 703 may comprise additional elements, such as a controller, capable of communicating with processing system 702 or possibly other systems.

Software 705 (including industrial automation device logic binding process 706) may be implemented in program instructions and among other functions may, when executed by processing system 702, direct processing system 702 to operate as described with respect to the various operational scenarios, sequences, and processes illustrated herein. For example, software 705 may include program instructions for implementing an embedded analytic engine for motor drives system as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtualization software, or other application software. Software 705 may also comprise firmware or some other form of machine-readable processing instructions executable by processing system 702.

In general, software 705 may, when loaded into processing system 702 and executed, transform a suitable apparatus, system, or device (of which computing system 701 is representative) overall from a general-purpose computing system into a special-purpose computing system customized to provide drive embedded condition monitoring as described herein. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, radiofrequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of networks, or variation thereof. The aforementioned communication networks and protocols are well known and need not be discussed at length here.

While some examples provided herein are described in the context of an embedded analytic engine, it should be understood the condition monitoring systems and methods described herein are not limited to such embodiments and may apply to a variety of other condition monitoring environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A computing apparatus comprising:
one or more computer-readable storage media; and
one or more processors operatively coupled with the one or more computer-readable storage media; and
program instructions stored on the one or more computer-readable storage media for integrating industrial automation device configurations and application logic that, when executed by the one or more processors, direct the computing apparatus to at least:
identify a list of devices associated with an industrial automation process in an operating environment;
obtain, from a parameter database associated with the operating environment, a logical representation of each device in the list of devices, wherein the logical representation comprises at least a first device configuration parameter associated with each device;
obtain, from a process database associated with a programming environment configured to control the industrial automation process, a system representation of the industrial automation process, wherein the system representation identifies at least a second device configuration parameter and the application logic associated with each device in the list of devices;
configure an automation file with at least the first device configuration parameter, the second device configuration parameter, and the application logic associated with each device in the list of devices; and
enable, in a programmable controller, the automation file to provide control over aspects of the industrial automation process in the programming environment.

2. The computing apparatus of claim 1, wherein to obtain, from the parameter database associated with the operating environment, the logical representation of each device in the list of devices, the program instructions, when read and executed by the one or more processors, further direct the computing apparatus to communicate with the parameter database over an application programming interface (API).

3. The computing apparatus of claim 1, wherein to obtain, from the process database associated with the programming environment configured to control the industrial automation process, the system representation of the industrial automation process, the program instructions, when read and executed by the one or more processors, further direct the computing apparatus to determine a parent-child relationship between each device in the list of devices and an industrial automation controller.

4. The computing apparatus of claim 1, wherein to obtain, from a process database associated with the programming environment configured to control the industrial automation process, the system representation, the program instructions, when read and executed by the processing system, further direct the computing apparatus to communicate with the process database over an API.

5. The computing apparatus of claim 1, wherein the at least first configuration parameter associated with each device comprises at least one of an industrial automation controller, a communication module, an industrial automation task, an industrial operation mode, and a device identifier.

6. The computing apparatus of claim 1, wherein to enable, in the programmable controller, the program instructions, when read and executed by the processing system, further direct the computing apparatus to:
surface the system representation in a graphical user interface.

7. A method of integrating industrial automation device configurations and application logic, the method comprising:
identifying a list of devices associated with an industrial automation process in an operating environment;
obtaining, from a parameter database associated with the operating environment, a logical representation of each device in the list of devices, wherein the logical representation comprises at least a first device configuration parameter associated with each device;
obtaining, from a process database associated with a programming environment configured to control the industrial automation process, a system representation of the industrial automation process, wherein the system representation identifies at least a second device configuration parameter and the application logic associated with each device in the list of devices;
configuring an automation file with at least the first device configuration parameter, the second device configuration parameter, and the application logic associated with each device in the list of devices; and enabling, in a programmable controller, the automation file to provide control over aspects of the industrial automation process in the programming environment.

8. The method of claim 7, wherein obtaining, from the parameter database associated with the operating environment, a logical representation of each device in the list of devices further comprises communicating with the parameter database over an application programming interface (API).

9. The method of claim 7, wherein obtaining, from the process database associated with the programming environment configured to control the industrial automation process, the system representation of the industrial automation process further comprises determining a parent-child relationship between each device and an industrial automation controller.

10. The method of claim 7, wherein obtaining, from a process database associated with the programming environment configured to control the industrial automation process, the system representation further comprises communicating with the process database over an API.

11. The method of claim 7, wherein the at least first configuration parameter associated with each device comprises at least one of an industrial automation controller, a communication module, an industrial automation task, an industrial operation mode, and a device identifier.

12. The method of claim 7, wherein the application logic comprises one or more input/output configurations of each device in the list of devices.

13. The method of claim 7, further comprising surfacing the system representation in a graphical user interface.

14. One or more computer-readable storage media having program instructions stored thereon to perform condition monitoring in an industrial automation environment, wherein the program instructions, when read and executed by a processing system, direct the processing system to at least:

identify a list of devices associated with an industrial automation process in an operating environment;

obtain, from a parameter database associated with the operating environment, a logical representation of each device in the list of devices, wherein the logical representation comprises at least a first device configuration parameter associated with each device;

obtain, from a process database associated with a programming environment configured to control the industrial automation process, a system representation of the industrial automation process, wherein the system representation identifies at least a second device configuration parameter and application logic associated with each device in the list of devices;

configure an automation file with at least the first device configuration parameter, the second device configuration parameter, and the application logic associated with each device in the list of devices; and enable, in a programmable controller, the automation file to provide control over aspects of the industrial automation process in the programming environment.

15. The one or more computer-readable storage media of claim 14, wherein to obtain, from a parameter database associated with the operating environment, a logical representation of each device in the list of devices, the program instructions, when read and executed by the processing system, further direct the processing system to communicate with the parameter database over an application programming interface (API).

16. The one or more computer-readable storage media of claim 14, wherein to obtain, from a process database associated with a programming environment configured to control the industrial automation process, the system representation of the industrial automation process, the program instructions, when read and executed by the processing system, further direct the processing system to determine a parent-child relationship between each device and an industrial automation controller.

17. The one or more computer-readable storage media of claim 14, wherein to obtain, from a process database associated with a programming environment configured to control the industrial automation process, the system representation, the program instructions, when read and executed by the processing system, further direct the processing system to communicate with the process database over an API.

18. The one or more computer-readable storage media of claim 14, wherein the at least first configuration parameter associated with each device comprises at least one of an industrial automation controller, a communication module, an industrial automation task, an industrial operation mode, and a device identifier.

19. The one or more computer-readable storage media of claim 14, wherein the application logic comprises one or more input/output configurations for each device in the list of devices.

20. The one or more computer-readable storage media of claim 14, wherein the program instructions, when read and executed by the processing system, further direct the processing system to surface the system representation in a graphical user interface.

* * * * *